(12) United States Patent
Schechter

(10) Patent No.: US 9,404,428 B1
(45) Date of Patent: Aug. 2, 2016

(54) VARIABLE-EXPANSION-RATIO ENGINE

(71) Applicant: Michael Moses Schechter, Deerfield Beach, FL (US)

(72) Inventor: Michael Moses Schechter, Deerfield Beach, FL (US)

( * ) Notice: Subject to any disclaimer, the term of this patent is extended or adjusted under 35 U.S.C. 154(b) by 0 days.

(21) Appl. No.: 14/545,236

(22) Filed: Apr. 13, 2015

(51) Int. Cl.
*F02D 23/00* (2006.01)
*F02D 15/04* (2006.01)
*F02D 37/02* (2006.01)

(52) U.S. Cl.
CPC ............... *F02D 15/04* (2013.01); *F02D 37/02* (2013.01)

(58) Field of Classification Search
CPC .......... F02D 15/04; F02D 13/23; F02D 37/02
USPC ............................... 60/602; 123/48 B, 406.29
See application file for complete search history.

(56) References Cited

U.S. PATENT DOCUMENTS

| 6,848,422 | B2* | 2/2005 | Hashizume | ............ | F02D 13/023 123/406.29 |
| 6,915,766 | B2* | 7/2005 | Aoyama | ............... | F02B 75/048 123/406.29 |
| 6,973,901 | B2* | 12/2005 | Machida | ............... | F01L 1/34 123/347 |
| 8,726,864 | B2 | 5/2014 | Cho et al. | | |
| 9,309,816 | B2* | 4/2016 | Kamiyama | ........... | F02B 75/041 |
| 2005/0241613 | A1* | 11/2005 | Weber | ................. | F01L 13/0015 123/316 |
| 2008/0087255 | A1* | 4/2008 | Aoyama | ............... | F02D 13/023 123/48 B |
| 2009/0007564 | A1* | 1/2009 | Suzuki | .................... | F02B 37/18 60/602 |
| 2009/0187329 | A1* | 7/2009 | Akihisa | ............... | F02D 13/0238 701/105 |

* cited by examiner

*Primary Examiner* — Nina Bhat

(57) ABSTRACT

An internal-combustion engine achieves much higher thermodynamic cycle efficiency than it is possible to achieve in other engines of the same type. It achieves this by operating with a much higher expansion ratio, without an increase in effective compression ratio. The engine geometric compression ratio is considerably larger than it is in conventional engines of the same type. It operates unthrottled most of the time, and the control of the volume of the intake air retained in the cylinder is performed by varying the timing of the intake valve closure. Ignition timing is after the top-dead-center most of the time. Suitable coordination of ignition timing control with intake valve timing control insures that the peak combustion pressure and temperature remain within acceptable limits.

10 Claims, 8 Drawing Sheets

VARIABLE-EXPANSION-RATIO ENGINE

BACKGROUND OF THE INVENTION

Combustion of hydrocarbon fuels in internal-combustion engines is a major contributor to an increase in carbon dioxide content in Earth atmosphere, which according to prevailing scientific consensus contributes to global warming. It is also responsible for the import of foreign oil, which adversely affects the national trade balance account. It is therefore imperative to achieve a substantial reduction in the amount of fuel consumed by internal-combustion engines on a national scale.

Most internal-combustion engines are used in ground transportation, and most vehicles driven on American roads use piston-type engines. In such engines, fuel consumption is determined mostly by the efficiency of the thermodynamic cycle employed by the engine. Efficiency of the cycle depends on how completely the gas in the cylinder expands. An increase in expansion ratio leads to higher cycle efficiency. However, an increase in expansion is usually associated with an increase in compression, and this may lead to excessive temperature and pressure. Therefore it is highly desirable to have a system and a method for internal-combustion engine operation that permits a substantial increase in effective combustion gas expansion, without an undesirable increase in the peak combustion temperature and pressure. Such a system and a method are the subject of the present invention.

PRIOR ART

The U.S. Pat. No. 8,726,864 to Jin Hee Cho et al describes what is called in the description an ACE (Active compression expansion ratio) engine. The engine includes:
1. Intake valve variable timing unit.
2. Exhaust valve variable timing unit.
3. Intake valve variable duration unit.
4. Exhaust valve variable duration unit.

The four systems, listed above, work continuously during engine operation varying the intake and exhaust valves timing and duration. It is stated in the description that the engine achieves improved air charging, reduced pumping loss, improved expansion efficiency and variable real compression ratio. None of the above advantages are listed in the Claims. The above patent does not involve reduction in the cylinder clearance volume leading to an increase in geometric compression ratio. The engine operation does not involve after-TDC ignition timing coordinated with intake-valve-closing time.

Efficiency of the expansion stroke depends on how completely the gas in the cylinder expands. This depends on the timing of the exhaust valve opening, because that is when the expansion of the gas in the cylinder effectively ends. In FIG. 9, in the above patent, in the CVVT+VVT mode (lower table), the timing of the exhaust valve opening for max. advance angle is BBDC 90 degrees. This is almost half the piston stroke before the BDC, and the expansion of the gas in the cylinder is greatly incomplete. Therefore the efficiency of the expansion is very low. Then, the timing is retarded up to 40 degrees, and the expansion of the gas in the cylinder becomes more complete. This improves the efficiency of the expansion, but only because that efficiency was previously greatly reduced. This cannot improve the overall efficiency of the engine. The above patent does not claim reduced fuel consumption.

In contrast to the above patent, the key factor in the present invention is a substantial reduction in the cylinder clearance volume and the consequent significant increase in the engine geometric compression ratio. In most engines, such an increase in geometric compression ratio is not feasible, because of a limit on acceptable peak temperature and pressure. The present invention avoids excessive temperature and pressure by combining late intake-valve-closure timing with late ignition timing that is properly coordinated with the intake valve timing. At most engine loads, the peak temperature and pressure remain constant at optimal values. In some cases, the peak compression pressure can be equal to the peak combustion pressure, which permits operating with very high geometric compression ratio. A very high effective expansion ratio is achieved without an increase in the effective compression ratio. This leads to much higher overall engine efficiency and to much lower fuel consumption.

Compared to the above patent, the present invention requires only one valve-timing-control unit for the intake valves, and nothing is required for the exhaust valves. This is substantial reduction in hardware cost and complexity.

The valve-duration-control method, employed by the present invention, performs identical changes in operation of all intake valves. This makes it suitable for engines with only one intake valve per cylinder. Many other systems vary the duration of the intake event by changing the phase relationship between two valves in each cylinder. This makes those systems applicable only to engines with two intake valve per cylinder. Many small engines have only one intake valve per cylinder.

OBJECTS AND ADVANTAGES

It is a key object of the present invention to achieve a substantial improvement in internal-combustion engine thermodynamic cycle efficiency. This is achieved by increasing the effective expansion of the combustion gas, without increasing the effective compression of the intake gas. This leads to significant reduction in fuel consumption.

Another object of the present invention is to develop a piston-type engine that can operate with a very high geometric compression ratio, without excessive peak combustion pressure and temperature. This is achieved by suitable coordination of variable late intake-valve-closure timing with variable late ignition timing. High geometric compression ratio facilitates increased expansion of combustion gas, and this leads to improved engine efficiency and reduced fuel consumption.

Still another object of the present invention is to develop an engine, in which the pressure and the temperature, at the time of ignition, as well as the peak combustion pressure and temperature, remain constant regardless of changes in engine load. This is achieved by proper control of both the ignition timing and the intake-valve-closure timing. Keeping the above pressures and temperatures constant at optimal values optimizes the efficiency of the engine cycle and reduces the fuel consumption.

A further object of the present invention is to develop an engine, in which the peak compression pressure, at full engine load, is equal to the peak combustion pressure. This permits to maximize the engine geometric compression ratio, which contributes to reduced fuel consumption.

Yet another object of the present invention is to make the invention applicable to engines having only one intake valve per cylinder. This is achieved by developing a valve control system that makes equal changes in valve opening duration in each individual intake valve operation. This eliminates the need to have two intake valves in each cylinder.

SUMMARY

The engine of the present invention, the variable-expansion-ratio engine, achieves much higher thermodynamic cycle efficiency than it is possible to achieve in other engines of the same type. It achieves this by operating with a much higher expansion ratio, without an increase in effective compression ratio.

The engine is equipped with variable intake-valve-closure timing and with variable ignition timing. It has a considerably smaller clearance volume than it is common in conventional engines of the same size and type. Therefore its geometric compression ratio is considerably larger than it is in conventional engines. Geometric compression ratio is the ratio of the cylinder volume at bottom-dead-center (BDC) to the cylinder volume at top-dead-center (TDC).

The engine operates unthrottled most of the time, and the control of the volume of the intake air retained in the cylinder is performed by varying the timing of the intake valve closure. At light load, the timing of the intake-valve closure is very late, and only a small volume of intake air is retained. The ignition timing, at light load, is at or close to TDC. To increase the engine load, the intake-valve-closure timing is advanced, while the ignition timing is concurrently retarded. To reduce the engine load, the intake-valve-closure timing is retarded, while the ignition timing is concurrently advanced.

DESCRIPTION

The engine of the present invention, the variable-expansion-ratio engine, achieves much higher thermodynamic cycle efficiency than it is possible to achieve in other engines of the same type. It achieves this by operating with a much higher expansion ratio, without an increase in effective compression ratio.

The engine is a reciprocating-piston-type engine. It is equipped with variable intake-valve-closure timing and with variable ignition timing. It has a considerably smaller clearance volume than it is common in conventional engines of the same size and type. Therefore its geometric compression ratio is considerably larger than it is in conventional engines.

The engine operates unthrottled most of the time, and control of the volume of the intake air retained in the cylinder is performed by varying the timing of the intake valve closure. High operational engine efficiency and low fuel consumption is achieved by greatly increasing the effective expansion ratio, without increasing the effective compression ratio. Proper control of peak temperature and pressure is achieved by suitable coordination of late intake-valve-closure timing with late ignition timing. The timing of ignition is after the TDC most of the time. Fuel can be added to the intake air before, during or after the intake. In some cases, direct fuel injection, with timing as late as after the TDC, can be used during heavy-load operation.

Figure 1:
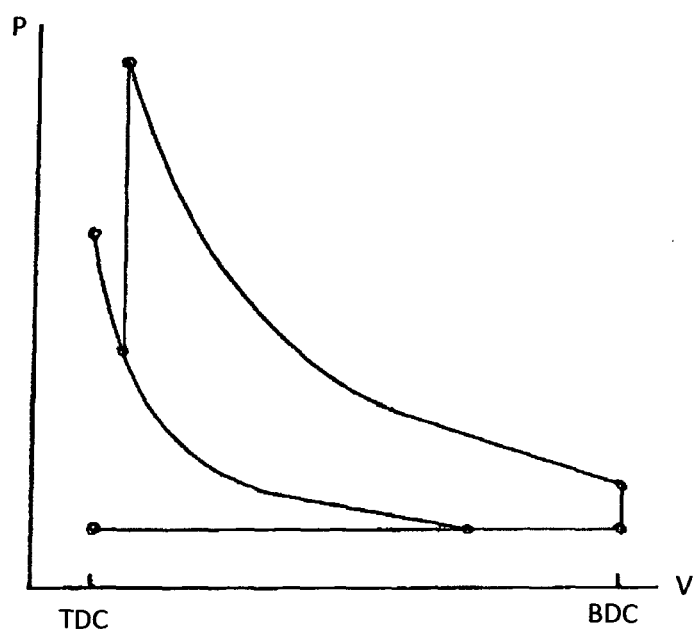
FIG. 1 illustrates an example of a pressure-volume (PV) diagram of the engine ideal cycle at medium load.

FIG. 1 illustrates an example of a pressure-volume (PV) diagram of the engine ideal cycle at medium load. The intake charge is compressed to a very high pressure at top-dead-center (TDC), but the ignition is delayed, and the gas is subject to partial expansion until its temperature and pressure drop to sufficiently low values. A more detailed description of such a cycle is given in the section entitled Operation.

Figure 2:
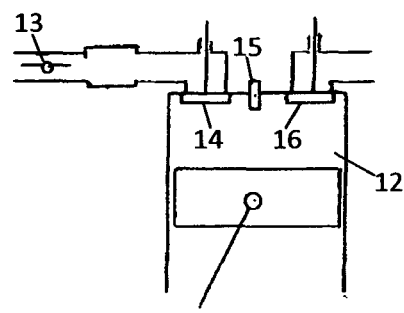
FIG. 2 is a schematic illustration of a top part of lateral crossection of the engine.

FIG. 2 is a schematic illustration of a top part of lateral crossection of the engine. Intake gas enters a cylinder 12 via an intake valve 14, and exhaust gas exits cylinder 12 via an exhaust valve 16. A spark plug 15 is the source of ignition. The engine may have a plurality of such cylinders. The engine system may include a throttle plate 13, which remains wide open most of the time.

Figure 3:
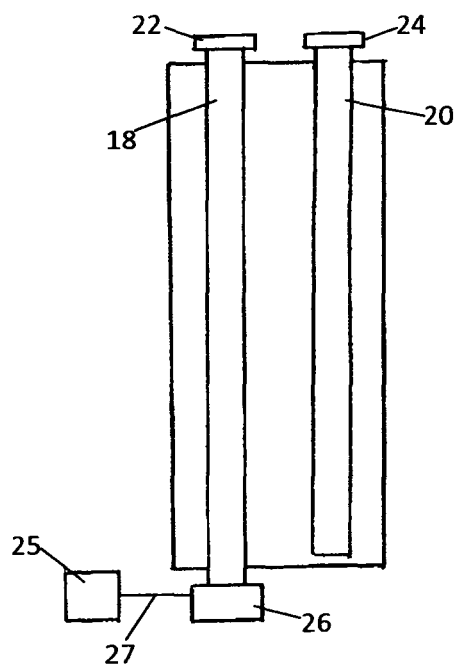
FIG. 3 shows a simplified plane view of the engine schematically illustrating the arrangement of the intake and exhaust camshafts on the engine.

FIG. 3 shows a simplified plane view of the engine schematically illustrating the arrangement of the intake and exhaust camshafts on the engine. An intake camshaft 18 controls intake valve 14 and an exhaust camshaft 20 controls exhaust valve 16. Camshafts 18 and 20 are each equipped with a sprocket (or gear) 22 or 24, respectively, through which they are driven from the engine crankshaft (not shown). Intake camshaft 18 is also equipped with a phase-shifting unit 26 capable to vary the intake-valve-closure timing in the engine. The engine is also equipped with a control unit 25 that controls the operation of the engine in response to operator's demands and in accordance with a control program incorporated in the control unit. Control unit 25 controls phase-shifting unit 26 via an electric cable 27.

Figure 4:
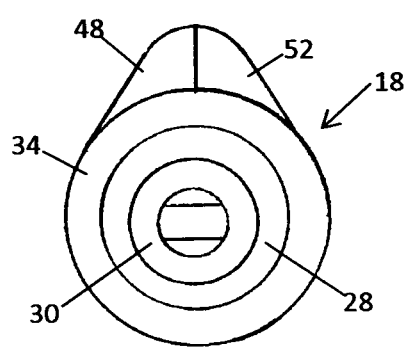
FIG. 4 shows a lateral crossection of intake camshaft 18 through one of its camlobes.
Figure 5:
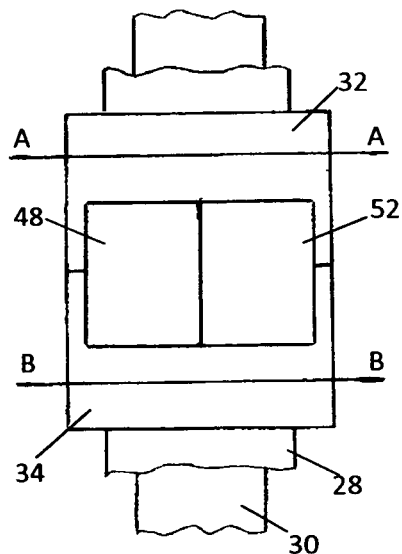
FIG. 5 shows a plane view of the area of the camshaft shown in FIG. 4.

FIGS. 4 through 12 show an example of how the variable intake-valve-closure timing may be accomplished. FIG. 4 shows a lateral crossection of intake camshaft 18 through one of its camlobes. FIG. 5 shows a plane view of the area of the camshaft shown in FIG. 4. Camshaft 18 includes an outer shaft 28 that is tubular in shape, and an inner shaft 30 slidingly fitting into outer shaft 28. Inner shaft 30 may be tubular too.

Figure 7:
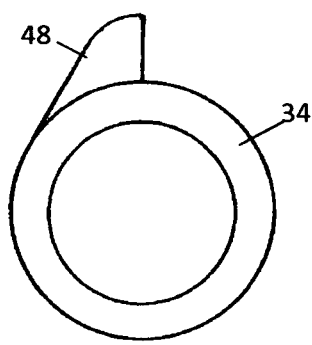
FIG. 7 shows a side view of a single second ring 34.

A set of pairs of camshaft rings is mounted at specific locations on the outer surface of outer shaft 28. Each pair of rings forms a camlobe, and each specific pair of rings location corresponds to a specific intake valve location. Each pair of rings includes a first ring 32 that is fixedly connected to outer shaft 28, and a second ring 34 that is fixedly connected to inner shaft 30. FIG. 7 shows a side view of a single second ring 34.

Figure 8:
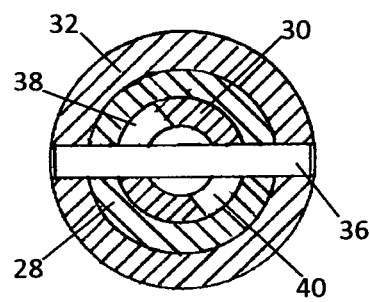
FIG. 8 is a crossection along lines A-A in FIG. 5.
Figure 9:
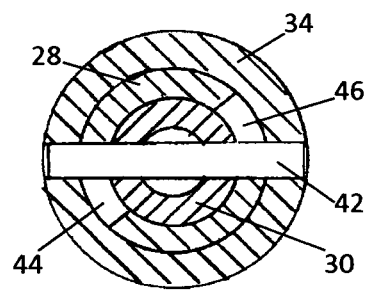
FIG. 9 is a crossection along lines B-B in FIG. 5.

FIG. 8 is a crossection along lines A-A in FIG. 5. It illustrates how first ring 32 is connected to outer shaft 28. A pin 36 is pressed into first ring 32 and into outer shaft 28, but it is free to move within the limits of slots 38 and 40 made in inner shaft 30. FIG. 9 is a crossection along lines B-B in FIG. 5. It illustrates how second ring 34 is connected to inner shaft 30. A pin 42 is pressed into second ring 34 and into inner shaft 30, but it is free to move within the limits of slots 44 and 46 made in outer shaft 28. In that way, outer shaft 28 with connected set of first rings 32, and inner shaft 30 with connected set of second rings 34 can rotate relative to one another within the limits provided by slots 38 and 40, and 44 and 46.

Figure 10:
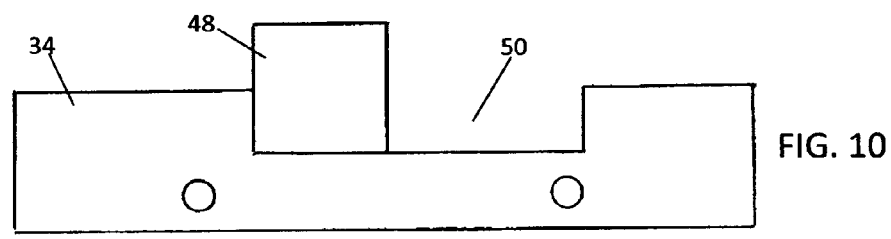
FIG. 10 shows the second ring 34 in development.
Figure 11:
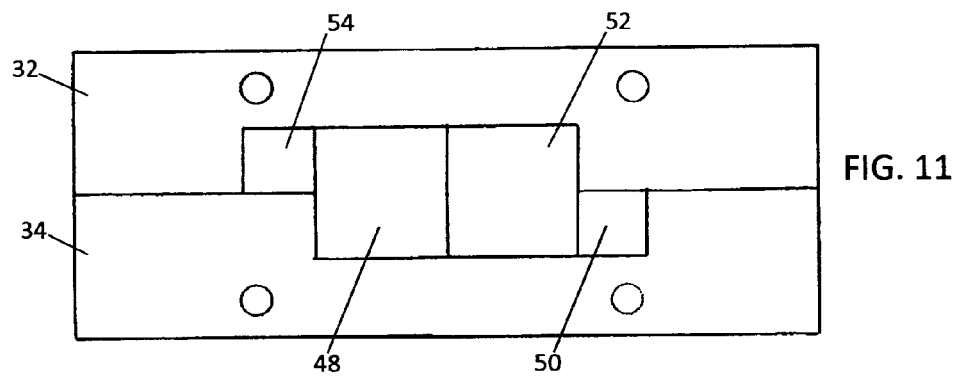
FIG. 11 shows, in development, the first ring 32 facing the second ring 34.

Each camshaft ring is shaped so that it forms a half-lobe partially protruding from its side, and it has a slot in its side next to the half-lobe. This is illustrated in FIG. 10, in which the second ring 34 is shown in development. A development is a conversion of a three-dimensional feature into a two-dimensional one in a drawing. A second half-lobe 48 partially protrudes from the side of second ring 34, and a slot 50 is next to it. Each pair of rings is mounted so that the two rings face each other. This is illustrated in FIG. 11, which shows, in development, first ring 32 facing second ring 34. Second half-lobe 48, formed in second half-ring 34, fits into a slot 54 made in the side of first half-ring 32. First half-lobe 52, formed in first half-ring 32, fits into a slot 50 made in the side of second half-ring 34. Together, first half-lobe 52 and second half-lobe 48 form a single camlobe, as shown in FIG. 4.

Figure 6:
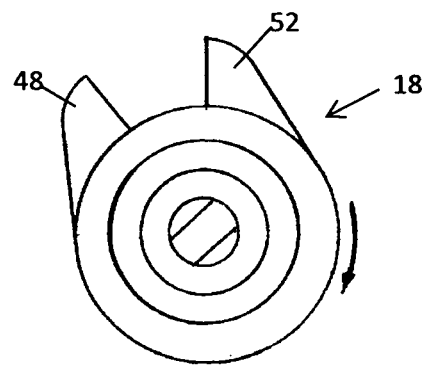
FIG. 6 illustrates increasing the duration of the valve-opening event.
Figure 12:
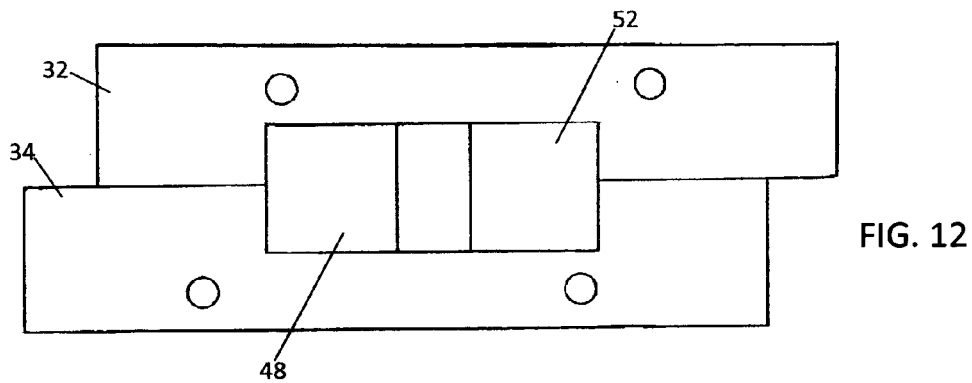
FIG. 12 illustrates the second half-lobe 48 sliding away from the first half-lobe 52.

Outer shaft 28 and inner shaft 30 are connected to one another via phase-shifting unit 26 (FIG. 3) capable to transmit motion and vary the phase relationship between outer shaft 28 and inner shaft 30. Phase shifters are widely known and broadly used devices. There is a variety of different designs. They are frequently used in automobile engines to vary the phase relationship between the engine crankshaft and camshaft. When phase shifting unit 26 (FIG. 3) retards the phase of inner shaft 30 relative to the phase of outer shaft 28, second half-lobe 48 moves away from first half-lobe 52 thus increasing the duration of the valve-opening event, as shown in FIG. 6. The valve will stay in the vicinity of its full opening position for a longer crank angle period, which can be varied. This is also illustrated in FIG. 12, where second half-lobe 48 slides away from first half-lobe 52. This type of camlobe is best suitable to be used with flat valve tappets. During the transition from the tip of one half-lobe to the tip of another one (FIG. 6), the valve remains in proximity to its full opening position. With the direction of camshaft 18 rotation indicated by an arrow in FIG. 6, the end of valve-opening event is retarded relative to the engine crankshaft timing. Varying the setting of phase-shifting unit 26 varies the timing of intake valve 14 closure. It also varies the duration of the entire intake event.

In the above described system, it was inner shaft 30 that was retarded relative to outer shaft 28. However in other such systems, it may be the outer shaft that determines the end of the valve-opening event. In that case, it is the outer shaft that is retarded relative to the inner shaft.

Operation

The engine of the present invention, the variable-expansion-ratio engine, achieves much higher thermodynamic cycle efficiency than it is possible to achieve in other engines of the same type. It achieves this by operating with a much higher expansion ratio, without an increase in compression ratio.

The engine is equipped with variable intake-valve-closure timing and with variable ignition timing. It has a considerably smaller clearance volume than it is common in conventional engines of the same size and type. Therefore its geometric compression ratio is considerably larger than it is in conventional engines. Geometric compression ratio is the ratio of the cylinder volume at bottom-dead-center (BDC) to the cylinder volume at top-dead-center (TDC). The bottom-dead-center (BDC) is when the cylinder volume is at its maximum. The top-dead-center (TDC) is when the cylinder volume is at its minimum.

The engine operates unthrottled most of the time, and the control of the volume of the intake air retained in the cylinder is performed by varying the timing of the intake valve closure. At light load, the timing of the intake-valve closure is very late, and only a small volume of intake air is retained. The ignition timing, at light load, is at or close to TDC. To increase the engine load, the intake-valve-closure timing is advanced, while the ignition timing is concurrently retarded. To reduce the engine load, the intake-valve-closure timing is retarded, while the ignition timing is concurrently advanced.

Figure 13:
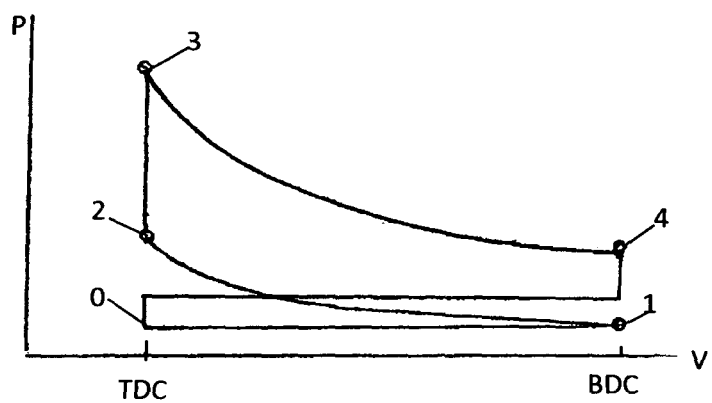
FIG. 13 shows an example of a pressure-volume (PV) diagram of an ideal four-stroke cycle in a conventional engine at light-load operation.
Figure 14:
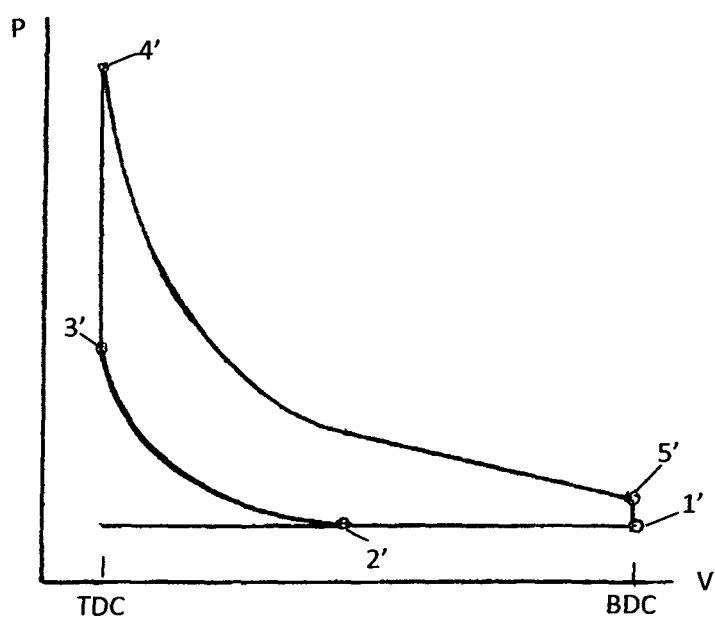
FIG. 14 shows an example of a PV diagram of an ideal four-stroke cycle in a variable-expansion-ratio engine at light-load operation.
Figure 15:
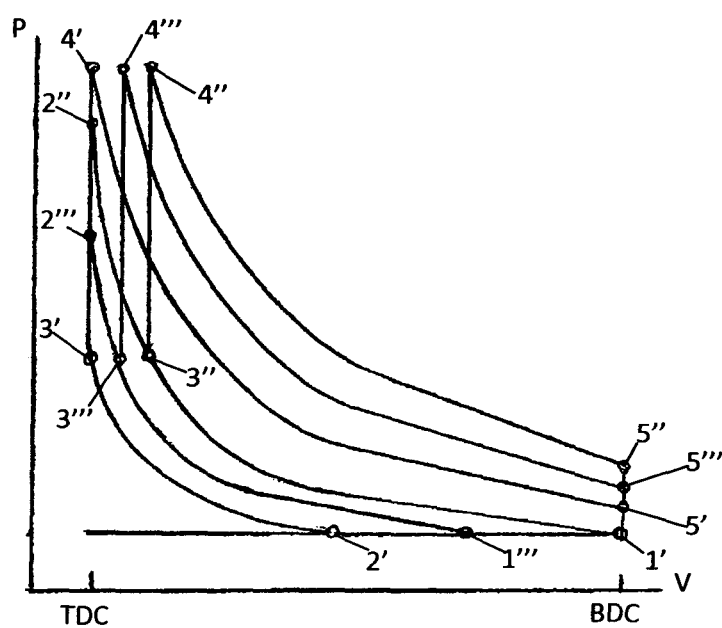
FIG. 15 illustrates load control in the variable-expansion-ratio engine.

Operation of the variable-expansion-ratio engine is illustrated in FIGS. 13, 14 and 15. For comparison purpose, FIG. 13 shows an example of a pressure-volume (PV) diagram of an ideal four-stroke cycle in a conventional engine at light-load operation. The compression and expansion strokes are defined by lines running through the points 1, 2, 3 and 4. The engine is throttled, and the pressure at point 1 is equal to one half of the atmospheric pressure. The gas temperature at that point is assumed to be equal to atmospheric air temperature. From point 1 to point 2, the intake valve is closed and compression takes place. At point 2, the air/fuel mixture is ignited, and from point 2 to point 3, combustion takes place at constant volume. From point 3 to point 4, the gas is expanded. The expansion ratio is equal to the compression ratio. The total work performed also includes pumping work due to the throttling of the intake air during intake stroke. The net work performed is equal to expansion work less the compression work and less the pumping work.

FIG. 14 shows an example of a PV diagram of an ideal four-stroke cycle in a variable-expansion-ratio engine at light-load operation. The full cylinder volume is equal to the full cylinder volume in the conventional engine illustrated in FIG. 13, but the clearance volume is reduced in half. The compression and expansion strokes are defined by lines running through the points 1', 2', 3', 4' and 5'. The engine is unthrottled, and the pressure at point 1' is equal to the atmospheric pressure. The gas temperature at that point is assumed to be equal to atmospheric air temperature.

From point 1' to point 2', the intake valve is open, and the piston pushes the gas out of the cylinder back into the intake port. The cylinder volume at point 2' is equal to one half of the volume at point 1', but the gas is at the same pressure and temperature at both points. Since the pressure at point 2' is twice the pressure at point 1 (FIG. 13), but only one half of the volume at point 1 (FIG. 13), the mass at point 2' is equal to the mass at point 1 (FIG. 13).

At point 2', the intake valve closes, and from point 2' to point 3', the gas is compressed to a minimum volume at point 3', which in this case is at TDC. At that point ignition takes place. The effective compression ratio is equal to the ratio of volume at point 2' to the volume at point 3'. The effective compression ratio is the ratio of the cylinder volume at the time of the intake valve closure to the cylinder volume at the time of ignition. In this case, the effective compression ratio is equal to one half of the geometric compression ratio in this engine. Since the volume at point 2' is one half of the volume at point 1 (FIG. 13), and the volume at point 3' is equal to one half of the volume at point 2 (FIG. 13); the effective compression ratios in both cycles are equal. However, since the pressure at the beginning of compression point 2', is twice the pressure at the beginning of compression point 1 (FIG. 13), the pressure at the end of compression point 3' (FIG. 14) is twice the pressure at the end of compression point 2 (FIG. 13). The temperatures at points 3' (FIG. 14) and 2 (FIG. 13) are equal, because the temperatures at points 1' (FIG. 14) and 1 (FIG. 13) are equal. Since the volume at point 2' is one half of the volume at point 1 (FIG. 13), but twice the pressure, the masses of the gas, at the beginnings of compression (points 2' and 1, respectively), are equal in both engines. Since the two engines compress equal gas masses and have equal effective compression ratios, they perform equal compression work.

The work performed during the entire compression stroke also includes pumping work performed between points 1' and 2' in FIG. 14. That work is equal to the pumping work performed, during intake, between points 0 and 1 in the cycle illustrated in FIG. 13.

Ignoring small differences in the amount of residual gas present in the intake gas, the masses of air in both engines, at the beginning of compression, can be considered approximately equal. If the masses of air are equal, equal amounts of fuel can be burned. At point 3', the air/fuel mixture is ignited and, from point 3' to point 4', combustion takes place at constant volume. The pressure at point 4' is much higher than the pressure at point 3 (FIG. 13), because the pressure at point 3' is higher than the pressure at point 2 (FIG. 13). However, the temperatures at points 4' (FIG. 14) and 3 (FIG. 13) must be equal, because the temperatures at points 3' (FIG. 14) and 2 (FIG. 13) are equal, and the two engines burn equal amounts of fuel.

From point 4' to point 5', the gas is expanded. At point 5', which is at BDC, the exhaust valve opens, and the expansion is terminated. Since the point 4' is at TDC and the point 5' is at BDC, the effective expansion ratio is equal to the geometric compression ratio. Therefore, in this engine, the effective expansion ratio is two times larger than the effective compression ratio. The effective expansion ratio is the ratio of the cylinder volume at the time of the exhaust valve opening to the cylinder volume at the time of ignition. The net work performed is equal to expansion work less the compression work and less the pumping work.

In conclusion, we can see that the two engines, illustrated in FIGS. 13 and 14, have equal effective compression ratios and burn equal amounts of fuel, but the effective expansion ratio in the variable-expansion-ratio engine, shown in FIG. 14, is two times larger than the expansion ratio in the conventional engine shown in FIG. 13. The pumping works are equal. Hence the net work performed in the variable-expansion-ratio engine is greater than in the conventional engine, and the efficiency of the engine is much better.

FIG. 15 illustrates load control in the variable-expansion-ratio engine. It shows three superimposed graphs of PV diagrams at three different loads in the same engine. One of the three diagrams illustrates a light-load cycle identical to the cycle shown in FIG. 14. The compression and expansion strokes, in this cycle, are defined by lines running through the points 1', 2', 3', 4' and 5'. An increase in the engine load can be accomplished by advancing the timing of the intake-valve closure. This increases the volume of air trapped in the cylinder and permits burning of greater amount of fuel. The greater is that timing advance, the greater is the increase in load. A concurrent ignition timing retard prevents excessive increase in peak pressure and temperature. This is illustrated in the second graph.

The second graph shows a PV diagram of heavy-load cycle in the same engine. The compression and expansion strokes, in this cycle, are defined by lines running through points 1', 2", 3", 4" and 5". The pressure and temperature at point 1' are the same in both cycles, but in contrast to the light-load cycle, the intake valve, in the heavy-load cycle, closes at point 1'. Thus the mass of gas trapped in the cylinder at point 1' is twice the mass of gas trapped at point 2'.

Between points 1' and 2", the gas is compressed. Ignition is delayed, and between points 2" and 3", partial expansion of the gas takes place. At point 3", the gas/fuel mixture is ignited. The timing of that point is selected so that that the volume of the cylinder, at that point, is twice the volume at point 3'. Since the volume at the beginning of compression at point 1' is twice the volume at the beginning of compression at point 2", and that ratio is equal to the ratio of volumes at points 3" and 3', the effective compression ratio is the same in both cycles. The pressures and temperatures at points 3" and 3' are equal, because the pressures and temperatures at points 1' and 2' are equal, and the effective compression ratios are equal too.

From point 3" to point 4", combustion takes place at constant volume, so the volume at point 4" is twice the volume at point 4'. The mass of fuel burned in the heavy-load cycle is twice the mass of fuel burned in the light-load cycle, but the mass of gas is two times larger too. Therefore the pressure and temperature at point 4" are equal to those at point 4'.

From point 4" to point 5", the gas expands. Since the volume at point 5" is equal to the volume at point 5', and the volume at point 4" is twice the volume at point 4'; the effective expansion ratio, in the heavy-load cycle, is only one half of the effective expansion ratio in the light-load cycle, and its efficiency benefit is lower. However, the pumping work is zero. Hence the overall efficiency is still better than the efficiency of the conventional engine.

To reduce the load of the engine from heavy load to some medium load, the quantity of the intake air retained in the cylinder must be reduced. This is accomplished by retarding the timing of the intake valve closure, as illustrated in the third graph in FIG. 15.

The third graph shows a PV diagram of medium-load cycle in the same engine. The compression and expansion strokes, in this cycle, are defined by lines running through points 1', 2''', 3''', 4''' and 5'''. The pressure and temperature at point 1' are the same as in the previously described cycles, but the closing of the intake valve is delayed until the piston is at point 1''', which, in this cycle, is at midpoint between points 1' and 2'.

From point 1' to point 1''', the intake valve is open, and the piston pushes the gas out of the cylinder back into the intake port. The rest of the cycle is similar to the previously described heavy-load cycle. Between points 1''' and 2''', the gas is compressed. Ignition is delayed and between points 2' and 3''' partial expansion of gas takes place. At point 3''', the gas/fuel mixture is ignited. The timing of that point is selected so that that the effective compression ratio, at that point, is the same as in the two previously described cycles. Therefore the pressure and temperature at point 3''' are equal to those at points 3' and 3".

From point 3''' to point 4''', combustion takes place at constant volume. The mass of fuel burned is proportional to the mass of air. Therefore the pressure and temperature at point 4''' are equal to those at points 4' and 4".

From point 4''' to point 5''', the gas expands. The volume at point 5''' is equal to the volumes at points 5' and 5". Since the volume at point 4''' is greater than at point 4' but less than at point 4", the effective expansion ratio, in this medium-load cycle, is less than at light load, but more than at heavy load.

In all three above described cycles, the pressure and the temperature at the time of ignition (points 3', 3" and 3''')

remain constant regardless of the changes in the engine load. The effective compression ratio remains constant. Also the peak combustion pressure and temperature (points 4', 4" and 4''') remain constant regardless of engine load. This permits optimization of operating pressures and temperatures, which contributes to better fuel efficiency.

The operation of the engine of the present invention can be summarized as follows:

(1) At medium load, the engine operates unthrottled, with intake-valve-closure timing maintained substantially after BDC in compression stroke, and ignition timing set after TDC in expansion stroke. The timing of the above intake-valve closure and the timing of the above ignition is such that the engine operates with effective expansion ratio that is considerably higher than its effective compression ratio, while the peak combustion temperature and pressure in the above engine do not exceed acceptable levels, (2) increasing the above engine load by advancing the intake-valve-closure timing to increase the quantity of intake gas retained in the above engine, and concurrently retarding the ignition timing to maintain the peak combustion temperature and pressure in the above engine at acceptable levels, and (3) decreasing the above engine load by retarding the intake-valve-closure timing to decrease the quantity of intake gas retained in the above engine, and concurrently advancing the ignition timing to maintain the peak combustion temperature and pressure in said engine at desirable levels.

The engine operates unthrottled most of the time, but some throttling may have to be used at some very light loads. It is likely that throttling will be used during idle operation.

In conclusion, we can see that the variable-expansion-ratio engine has a much better efficiency than a conventional engine, especially at light-load operation. With increase in the engine load, the benefit of higher efficiency is gradually diminished, but even at heavy load, the efficiency of the variable-expansion-ratio engine is better than it is in a conventional engine. Thus the application of the variable-expansion-ratio cycle is especially beneficial in engines for passenger automobiles, which operate at medium and light loads most of the time.

Figure 16:
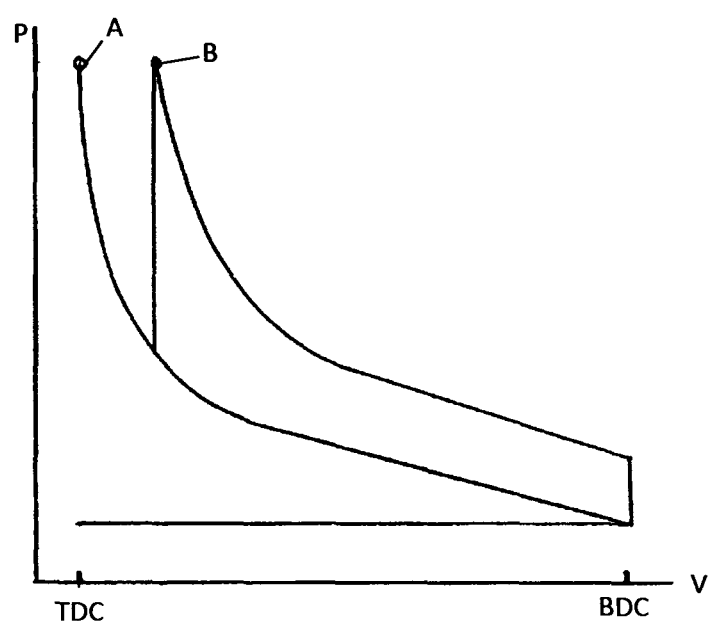
FIG. 16 illustrates an example of a PV cycle, in which the peak cylinder pressure, during the compression, becomes equal to the peak combustion pressure.

The higher the geometric compression ratio, the higher is the cycle efficiency at light and medium loads. The limiting factor is the pressure in the cylinder at maximum engine load, when the peak compression pressure is the highest. The limit is reached if the peak cylinder pressure, during the compression, becomes equal to the peak combustion pressure. This is illustrated in FIG. 16. The peak compression pressure at point A is equal to the peak combustion pressure at point B. The geometric compression ratio is maximized.

CONCLUSION

The engine of the present invention, the variable-expansion-ratio engine, achieves much higher thermodynamic cycle efficiency than it is possible to achieve in other engines of the same type. It achieves this by operating with a much higher expansion ratio, without an increase in effective compression ratio.

The engine is equipped with variable intake-valve-closure timing and with variable ignition timing. It has a considerably smaller clearance volume than it is common in conventional engines of the same size and type. Therefore its geometric compression ratio is considerably larger than it is in conventional engines. Geometric compression ratio is the ratio of the cylinder volume at bottom-dead-center (BDC) to the cylinder volume at top-dead-center (TDC).

The engine operates unthrottled most of the time, and the control of the volume of the intake air retained in the cylinder is performed by varying the timing of the intake valve closure. At light load, the timing of the intake-valve closure is very late, and only a small volume of intake air is retained. The ignition timing, at light load, is at or close to TDC. To increase the engine load, the intake-valve-closure timing is advanced, while the ignition timing is concurrently retarded. To reduce the engine load, the intake-valve-closure timing is retarded, while the ignition timing is concurrently advanced.

Although the description above contains much specificity, this should not be construed as limiting the scope of the invention, but as merely providing illustrations of some of the presently preferred embodiments of this invention. For example, although the preferred arrangement illustrated in FIGS. 3-12 anticipates a specific method for varying the intake-valve-closure timing, in other cases other systems and methods for valve timing control can be employed. In an engine with two intake valves per cylinder, varying the phase relationship between the two intake valves can be used to vary the timing and duration of the intake valve event. Hydraulic or pneumatic actuation of the intake valves can also be employed for this purpose.

Thus the scope of the invention should be determined by the appended claims and their legal equivalents, rather than by the examples given.

I claim:

1. A method for operating an internal-combustion engine comprising:
   (a) providing a piston-type internal combustion engine, wherein said engine geometric compression ratio is substantially higher than it is in other engines of the same type,
   (b) providing a means for varying intake-valve-closure timing in said engine,
   (c) providing a means for varying ignition timing in said engine,
   (d) providing a control means for controlling the operation of said engine in response to demands by an operator in accordance with the control programming in said control means,
   (e) operating said engine with said variable intake valve closure timing with said variable ignition timing wherein
      (1) operating said engine unthrottled at medium load, with said intake-valve-closure timing set substantially after bottom-dead-center in compression stroke, and said ignition timing set after top-dead-center in expansion stroke, said intake-valve-closure timing and said ignition timing being such that said engine operates with effective expansion ratio that is considerably higher than effective compression ratio in said engine, while the peak combustion temperature and pressure in said engine do not exceed predetermined acceptable levels,
      (2) increasing said engine load by advancing said intake-valve-closure timing to increase the quantity of intake gas retained in said engine, and concurrently retarding said ignition timing to maintain the peak combustion temperature and pressure in said engine at acceptable levels, and
      (3) decreasing said engine load by retarding said intake-valve-closure timing to decrease the quantity of intake gas retained in said engine, and concurrently advancing said ignition timing to maintain the peak combustion temperature and pressure in said engine at desirable levels, and (f) using said control means provided for controlling the operation of said engine in step (d) to control operation of said engine, whereby varying said intake valve closure timing controls engine load, whereby controlling said ignition timing controls the peak combustion temperature and pressure in said engine, and whereby varying the ignition timing and the intake valve timing permits to use higher geometric compression and increases expansion thereby reducing engine fuel consumption and improving the efficiency of the engine.

2. The method of claim 1, wherein the peak combustion temperature and pressure remain constant and can be optimized, said temperature and pressure not being dependent on either engine load or engine operation.

3. The method of claim 1, wherein said temperature and pressure at ignition time remain constant and are not dependent on engine load or engine operation.

4. The method of claim 1, wherein peak compression pressure at maximum engine load is equal to peak combustion pressure, whereby said engine geometric compression ratio can be maximized.

5. The method of claim 1, wherein said varying intake-valve-closure timing involves varying duration of intake event.

6. The method of claim 1, wherein said varying intake-valve-closure timing is achieved by keeping each intake valve in vicinity of its full opening position for a variable crank angle period.

7. The method of claim 1, wherein said means for varying intake-valve-closure timing includes:

(a) a camshaft means comprising:
  (1) a pair of shafts including an outer shaft tubular in shape and an inner shaft slidingly fitting into said outer shaft, and
  (2) a set of pairs of camshaft rings mounted at specific locations on the outer surface of said outer shaft, wherein each said pair of camshaft rings includes a first ring fixedly connected to said outer shaft and a second ring fixedly connected to said inner shaft, wherein each said first ring has a first half-lobe partially protruding from its side and a first cutout in its side next to said first half-lobe, wherein each said second ring has a second half-lobe partially protruding from its side and a second cutout in its side next to said second half-lobe, wherein each said pair of camshaft rings is mounted so that said first half-lobe protruding from said first ring fits into said second cutout in said second ring and said second half-lobe protruding from said second ring fits into said first cutout in said first ring, and wherein said first half-lobe in said first ring and said second half-lobe in said second ring form a single camlobe capable to control an engine valve, (b) means to drive said camshaft means from said engine crankshaft, and (c) means to transmit motion between said outer shaft and said inner shaft through a phase-shifting means capable to vary phase relationship between said outer shaft and said inner shaft, whereby phase relationship between said first ring and said second ring can be varied, whereby duration of said engine intake-valve opening can be varied, and whereby said intake-valve-closure timing in said engine can be varied.

8. The method of claim 7, wherein said first ring and said second ring are identical in shape.

9. A system for operating an internal-combustion engine comprising:

(a) a piston-type internal combustion engine, wherein said engine geometric compression ratio is substantially higher than it is in other engines of the same type, (b) a means for varying intake-valve-closure timing in said engine, (c) a means for varying ignition timing in said engine, (d) a control means for controlling the operation of said engine in response to operator's demands and in accordance with a control program incorporated in said control means, said program including operating said engine with variable intake-valve-closure timing and with variable ignition timing, said operating comprising:

(1) operating said engine unthrottled at medium load, with said intake-valve-closure timing set substantially after bottom-dead-center in compression stroke, and said ignition timing set after top-dead-center in expansion stroke, said intake-valve-closure timing and said ignition timing being such that said engine operates with effective expansion ratio that is considerably higher than effective compression ratio in said engine, while the peak combustion temperature and pressure in said engine do not exceed predetermined acceptable levels, (2) increasing said engine load by advancing said intake-valve-closure timing to increase the quantity of intake gas retained in said engine, and concurrently retarding said ignition timing to maintain the peak combustion temperature and pressure in said engine at acceptable levels, and (3) decreasing said engine load by retarding said intake-valve-closure timing to decrease the quantity of intake gas retained in said engine, and concurrently advancing said ignition timing to maintain the peak combustion temperature and pressure in said engine at desirable levels.

10. A method for operating a piston-type internal-combustion engine with variable intake-valve-closure timing and with variable ignition timing, wherein said engine geometric compression ratio is substantially higher, wherein said engine operates unthrottled most of the time, wherein said ignition timing is after top-dead-center most of the time, wherein said engine operates with effective expansion ratio that is substantially higher than said engine effective compression ratio, and wherein control of said variable intake-valve-closure timing is coordinated with control of said variable ignition timing to insure that peak combustion pressure and temperature do not exceed predetermined acceptable levels, whereby efficiency of said engine thermodynamic cycle is substantially improved, and whereby said engine fuel consumption is substantially reduced.

* * * * *